W. P. LIMACHER.
BUMPER FOR AUTOMOBILES.
APPLICATION FILED MAR. 22, 1920.
1,341,917.
Patented June 1, 1920.
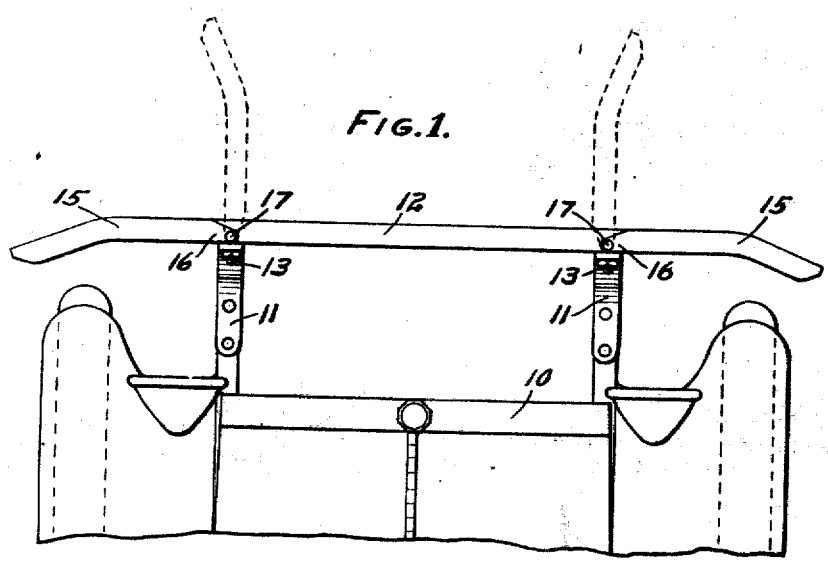
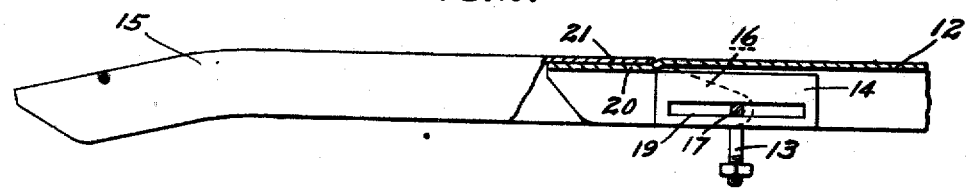
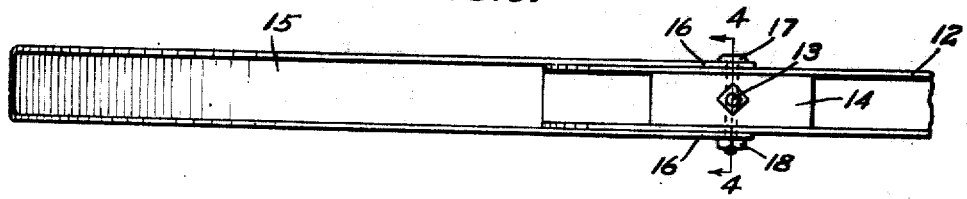
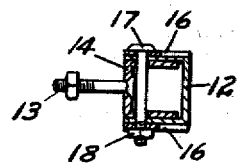
INVENTOR
WALTER P. LIMACHER
BY Hazard & Miller
ATT'YS.

UNITED STATES PATENT OFFICE.

WALTER P. LIMACHER, OF PASADENA, CALIFORNIA.

BUMPER FOR AUTOMOBILES.

1,341,917.  Specification of Letters Patent.  Patented June 1, 1920.

Application filed March 22, 1920. Serial No. 367,807.

*To all whom it may concern:*

Be it known that I, WALTER P. LIMACHER, a citizen of the United States, residing at Pasadena, in the county of Los Angeles and State of California, have invented new and useful Improvements in Bumpers for Automobiles, of which the following is a specification.

This invention relates to bumpers for automobiles and the like provided with hinged connections between the main bumper and its end horns, whereby the end horns may be swung relative to the main bumper to provide clearance space.

It is the object of this invention to provide a novel connection between the main bumper and its end horns arranged whereby the inner ends of the end horns, when the latter are in normal position in lateral elongation of the main bumper, will overlie and abut against the ends of the main bumper to provide an exceedingly durable construction; the parts furthermore being so arranged that the outer surfaces of the main bumper and of the end horns will be in the same plane so as to present flat unbroken outer surfaces at the connections between the main bumper and its end horns, thereby providing a neat and simple construction.

Further objects of the invention will be readily understood from the following description of the accompanying drawings in which:

Figure 1 is a plan view of the front end of an automobile having my improved bumper attached thereto.

Fig. 2 is an enlarged plan view of one end of my improved bumper partly broken away to show more clearly the hinged connection between the main bumper and its end horn.

Fig. 3 is a view in elevation of the end of the bumper shown in Fig. 2.

Fig. 4 is a vertical section taken on the line 4—4 of Fig. 3.

In the drawings a portion of an automobile 10 is shown provided with usual front bumper supports 11. A main bumper 12 extends across and in front of the automobile and is supported at its ends by the bumper supports 11. This main bumper is usually formed of channel iron and is preferably connected to the bumper supports by bolts 13 which may be rigidly secured at their heads to pieces of channel iron 14 arranged to be received within the channel of the main bumper 12.

The end horns of the bumper are hinged to the main bumper 12 so that they may be swung from their normal position as shown in full lines in Fig. 1 to the position shown in dotted lines in Fig. 1. These end horns are shown at 15 as formed of channel iron and are preferably suitably curved at their outer ends so as to terminate at points slightly in front of and at the outer sides of the wheels of the automobile. The inner ends of the end horns of the bumper are preferably received over the ends of the main bumper 12, and the inner ends of the end horns terminate in lips 16 at the upper and lower surfaces of the channel iron comprising the end horns. The hinged connection for the horn 15 is provided by a bolt 17 extending through the lips 16 of the end horn and through the upper and lower surfaces of the channel iron of the main bumper, this bolt being provided with a usual nut 18 for securing the parts in assembled relation. The pieces of channel iron 14 to which the bolts 13 for securing the bumper to the bumper supports are attached, are preferably retained within the channel of the main bumper by extending the bolts 17 through said pieces of channel iron, the latter for this purpose preferably being provided with elongated slots 19 so that the distance between the bolts 13 may be adjusted to the required width.

When the end horns of the bumper are in normal position in lateral elongation of the main bumper the inner ends of the horns abut against the outer ends of the main bumper thereby forming a bumper which will offer rigid resistance throughout its length to a force exerted against the bumper from the front. It may be found desirable however, to employ bolts 17 at the hinged connection between the main bumper and the end horns which will shear at a predetermined strength, thus separating the end horns from the main bumper and preventing bending or distortion of the end horns when an unusual excessive force is exerted against the bumper. When the automobile is being backed, or when the automobile is passed on the road by another machine there is a liability of the end horns of the bumper encountering some portion of the other machine, but since a hinged connection is provided between the main bumper and the end horns the latter will under these conditions swing forward to the position shown in dotted lines in Fig. 1, thereby avoiding injury to the bumper.

It is essential to the provision of a neat bumper construction that the outer face of the same shall present flat unbroken surfaces at the hinged connections between the main bumper and the end horns. In order to accomplish this result the portions of the ends of the main bumper which are overlapped by the ends of the horns 15 are offset below the plane of the outer surface of the main bumper as shown at 20, and the overlapping end portions 21 of the horns 15 are thus arranged to lie in the plane of the outer surface of the main bumper, thereby providing flat outer surfaces at the hinged connections of the end horns with the main bumper.

While I have shown the improved form of my bumper, it is evident that various changes in the combination, construction, and arrangements of the parts may be resorted to without departing from the spirit and scope of my invention.

I claim:

1. A bumper comprising a main body and end horns hinged thereto, said end horns overlapping the ends of said main body, the overlapped end portions of the main body being inwardly offset so that the overlapping ends of said end horns and main body will present plane outer surfaces.

2. A bumper comprising a main channel bar and end horns of channel bar overlapping the ends of said main channel bar, hinged members extending through the upper and lower walls of said overlapping channel bars; the overlapped end portions of the side wall of the main channel bar being inwardly offset whereby plane outer surfaces are provided at the overlapping ends of the said walls of the main channel bar and the end horns.

3. A bumper comprising a main channel bar and end horns of channel bar overlapping the ends of said main channel bar, hinged members extending through the upper and lower walls of said overlapping channel bars, supporting bolts having head members received within the channel of said main channel bar, said hinge members extending through said head members for securing the latter within said main channel bar.

In testimony whereof I have signed my name to this specification.

WALTER P. LIMACHER.